United States Patent [19]
Kishigami

[11] Patent Number: 5,878,082
[45] Date of Patent: Mar. 2, 1999

[54] DATA COMMUNICATION DEVICE FOR IMPLEMENTING ACCURATE DATA COMMUNICATION

[75] Inventor: Tomohisa Kishigami, Obu, Japan

[73] Assignee: Nippondenson Co., Ltd., Kariya, Japan

[21] Appl. No.: 701,973

[22] Filed: Aug. 23, 1996

[30]  Foreign Application Priority Data

Aug. 29, 1995 [JP] Japan .................................. 7-220839

[51] Int. Cl.$^6$ ............................................... H04L 12/40
[52] U.S. Cl. .......................... 375/257; 307/60; 326/82; 326/83; 327/108
[58] Field of Search .................................. 375/217, 257, 375/288, 317; 307/24, 31, 60; 326/30, 62, 68, 82, 83, 86; 327/108

[56] References Cited

U.S. PATENT DOCUMENTS

| | | | |
|---|---|---|---|
| 4,507,793 | 3/1985 | Adams | 375/257 |
| 4,605,864 | 8/1986 | Varadarajan et al. | 326/75 |
| 4,729,125 | 3/1988 | Sterling, Jr. et al. | 375/257 |
| 4,736,385 | 4/1988 | Pratt et al. | 375/219 |
| 4,737,787 | 4/1988 | Ito et al. | 340/870.18 |
| 4,742,309 | 5/1988 | Chu | 330/258 |
| 4,806,905 | 2/1989 | McGowan, III et al. | 340/310.02 |
| 4,929,941 | 5/1990 | Lecocq | 340/825.14 |
| 5,051,625 | 9/1991 | Ikeda et al. | 326/27 |
| 5,164,611 | 11/1992 | Summe | 327/170 |
| 5,218,248 | 6/1993 | Nagao | 327/65 |
| 5,241,564 | 8/1993 | Tang et al. | 326/90 |
| 5,432,817 | 7/1995 | Hormel et al. | 375/257 |
| 5,444,740 | 8/1995 | Mizukami et al. | 375/286 |
| 5,519,728 | 5/1996 | Kuo | 375/257 |
| 5,654,981 | 8/1997 | Mahant-Shetti et al. | 375/219 |

Primary Examiner—Young T. Tse
Attorney, Agent, or Firm—Pillsbury Madison & Sutro LLP

[57] ABSTRACT

An ECU for executing serial communication via a transmission line has a driver circuit. The driver circuit includes an integrator for integrating a transmission signal and a power source for generating a current which corresponds to the integrated value of the transmission signal and releasing the current to the transmission line. A terminal circuit for receiving a constant current smaller than a maximum current that the driver circuit can discharge is connected to the transmission line. Since the amount of output current from the driver circuit is gradually changed, the generation of noise in the transmission line can be prevented. Further, since the voltage of the transmission line immediately changes to either a high or low level depending on the amount of output current, accurate data communication can be performed.

21 Claims, 7 Drawing Sheets

FIG. 3A
TRANS. SIGNAL TX

FIG. 3B
CURRENT iL

FIG. 3C
VOLTAGE VL

FIG. 3D
RECEPTION SIGNAL RX

DATA COMMUNICATION DEVICE FOR IMPLEMENTING ACCURATE DATA COMMUNICATION

CROSS-REFERENCE TO RELATED APPLICATION

The present invention is related to and claims priority from Japanese Patent Application No. Hei-7-228039, the contents of which are incorporated herein by reference.

BACKGROUND OF THE INVENTION

1. Field of the Invention

The present invention relates to a data communication device for transmitting and receiving serial data via a transmission line. In particular, the present invention relates to a data communication device for performing data communication between electronic devices mounted on a vehicle or the like.

2. Description of Related Art

Conventional data communication devices for performing data communication between electronic devices prevent the generation of radio-frequency noise at rising and falling edges of a waveform of a transmission signal generated by a driver circuit by adjusting the slope of the signal. However, while data communication devices of this type try to eliminate radio noise by suppressing steep changes in the output voltage waveform from the driver circuit such as during the rising and falling edges of the waveform, noise cannot be fully suppressed when there is stray capacitance in the transmission line. In other words, since noise produced in the transmission line depends on the amount of change in the current per unit time, noise from the transmission line cannot be fully eliminated by only controlling steep changes in the output voltage waveform from the driver circuit because of possible steep changes in the waveform of the current flowing through the transmission line when stray capacitance is present.

SUMMARY OF THE INVENTION

In view of the foregoing problems in the prior art in mind, it is a primary object of the present invention to provide a data communication device for effectively suppressing noise in a transmission line and for implementing accurate data communication.

To achieve these aims, a first aspect of the present invention provides a data communication device for receiving a transmission signal from an external controller. The data communication device includes a plurality of communication units, a transmission line for connecting each communication unit to each other, and a constant current unit connected to the transmission line. Each communication unit performs serial data communication with each other via the transmission line based on the transmission signal. Each communication unit has a driver circuit for gradually varying current flow in the transmission line in accordance with the transmission signal. Meanwhile, the constant current unit conducts a constant amount of current in the transmission line in cooperation with the driver circuit. The constant amount of current conducted by the constant current unit is less than a maximum level of current up to which the driver circuit varies the current flow in the transmission line.

Preferably, the plurality of communication units are connected to a power source for providing current to the transmission line with the constant current unit absorbing the constant amount of current from the transmission line.

Also, it may also be that the plurality of communication units absorb current from the transmission line with the constant current unit being connected to a power source for providing the constant amount of current to the transmission line.

When the driver circuit provides current to the transmission line and the constant current unit absorbs the constant amount of current from the transmission line, the maximum current iD the driver circuit can release to the transmission line and the constant current amount iT which the constant current unit absorbs will be set such that iT<iD. The voltage level of the transmission line changes in accordance with the level of the transmission signal provided to the driver circuit so that the constant current unit receives the transmission signal accurately based on the voltage level of the transmission line.

That is, when the transmission signal provided to the driver circuit changes from the low level to the high level, an output current iL provided by the driver circuit to the transmission line increases gradually. The voltage level of the transmission line remains at the low level until the output current iL reaches the level of the constant current iT absorbed by the constant current unit.

Even if the output current iL from the driver circuit reaches the level of the constant current iT absorbed by the constant current unit, since the driver circuit can still increase the output current iL to the maximum value iD, the driver circuit tries to increase the output current iL even more. When the output current iL exceeds the level of constant current iT, the constant current unit will not be able to absorb all of the current generated by the driver circuit. As a result, the voltage level of the transmission line increases immediately. When the voltage level of the transmission line approaches the level of the supply voltage to the driver circuit, the driver circuit will not be able to increase the output current iL any further and the voltage level of the transmission line will be at the high level with the output current iL of the driver circuit stabilizing at the level of the constant current iT.

Next, when the transmission signal provided to the driver circuit inverts from the high level to the low level, the driver circuit reduces output current iL. When the output current iL from the driver circuit becomes less than the level of constant current iT absorbed by the constant current unit, the voltage level of the transmission line inverts immediately to the low level. With the output current iL of the driver circuit decreasing gradually, the voltage level of the transmission line remains at the low level and does not change. It must be noted here that the above-described operation will also hold true when the driver circuit absorbs current from the transmission line and the constant current unit supplies the constant amount of current to the transmission line.

Therefore, with the data communication device according to the present invention, although the amount of current discharged to (or absorbed from) the transmission line by the driver circuit gradually changes due to the operations of the driver circuit and the constant current unit, the voltage level of the transmission line inverts immediately from the high level to the low level and vice versa in accordance with the transmission signal provided to the driver circuit.

Since current flowing in the transmission line changes gradually, radio-frequency noise from the transmission line can be suppressed. In particular, when the speed of change in the output current from the driver circuit is reduced in order to remove such noise, the voltage level of the transmission line will still immediately invert at a predetermined level. Therefore, the transmission signal can be restored without being influenced by the change in the characteristics of the output current from the driver circuit. Therefore, the data communication device can be applied to an access method such as a Carrier Sense Multiple Access with Collision Detect (CSMA/CD) method or the like.

When the transmission signal inverts from the low level to the high level or vice versa, the driver circuit gradually increases or decreases the amount of the current discharged into (or absorbed from) the transmission line.

Preferably, the driver circuit includes an integrator for obtaining an integrated value by integrating the transmission signal and a current source for providing current to the transmission line based on the integrated value.

Although the present invention can be realized with one constant current unit connected to the transmission line, preferably, a plurality of constant current units are connected to the transmission line. In this way, a total amount of current discharged (or absorbed) by the plurality of constant current units is set to be smaller than the maximum amount of current the driver circuit can absorb (or discharge).

In this way, even if one of the constant current units breaks down, although the amount of the current absorbed or supplied by the driver circuit is reduced compared to the case when all of the constant current units are operating normally, the voltage level of the transmission line will still immediately change in accordance with the change in the voltage level of the transmission signal. Therefore, the transmission signal can be restored and thus, the reliability of the device improves.

Meanwhile, the transmission line may be a single line or a pair of twisted signal lines. If the transmission line is formed by a single line, the transmission line can be connected to a vehicle that serves as ground.

BRIEF DESCRIPTION OF THE DRAWINGS

Additional advantages and effects of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are hereinafter described with reference to the accompanying drawings.

Figure 2:
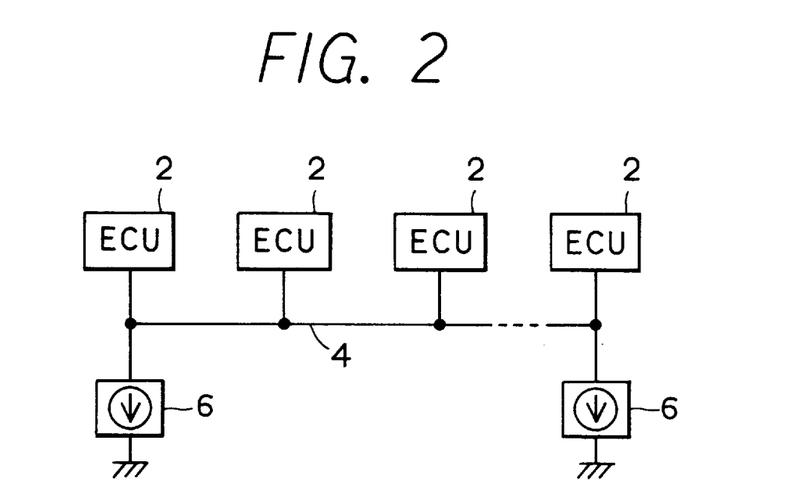
FIG. 2 is an overall schematic diagram of the data communication device according to the first embodiment.

FIG. 2 is a schematic diagram illustrating an overall construction of an automotive data communication device according to a first embodiment of the present invention.

As shown in FIG. 2, the data communication device of the present embodiment uses a transmission line 4 to connect ECUs (electronic control units) 2 which are used for engine control, transmission control, slip control and the like. Detection data that indicate various driving conditions of the vehicle, control data that indicate control states of various control targets and the like are transmitted and received between the ECUs 2 via the transmission line 4 and so, these ECUs 2 essentially form an automotive LAN (local area network) for sharing data. A pair of terminal circuits 6, which include constant current sources, connected to each end of the transmission line 4 absorb current from the same line 4 and discharge the current to a vehicle chassis which acts as ground.

Figure 1:
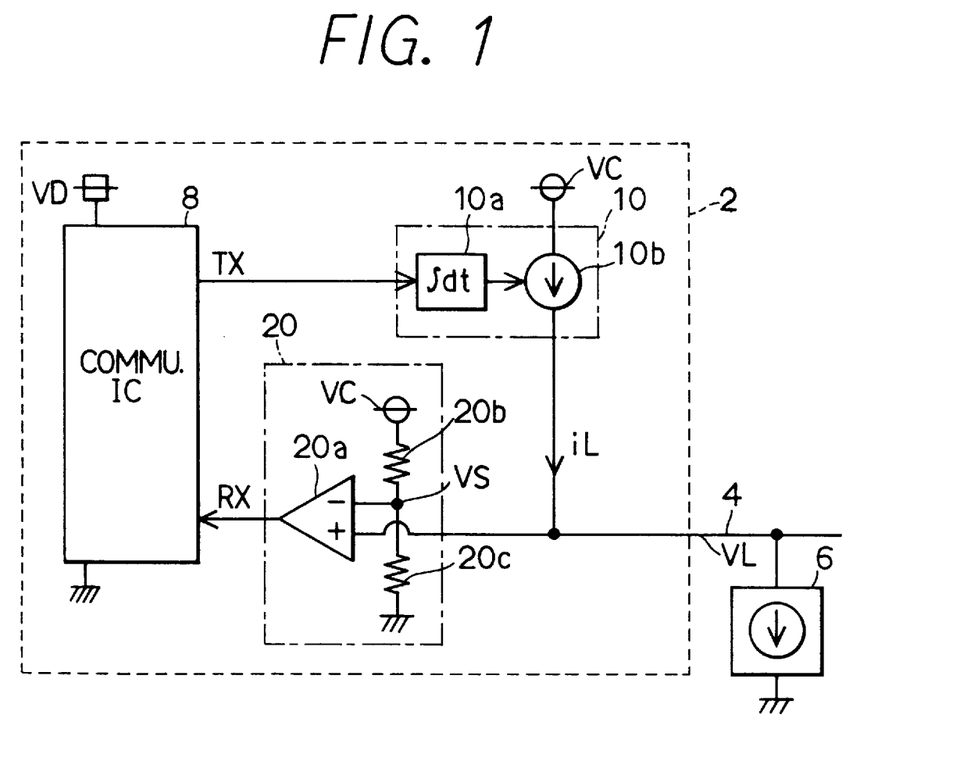
FIG. 1 is a schematic diagram of a basic configuration of a driver circuit and a receiver circuit disposed inside an electronic control unit of a data communication device according to a first embodiment of the present invention.

As shown in FIG. 1, each ECU 2 includes a communication IC (integrated circuit) 8. The communication IC 8 is different from a control circuit (which is normally formed using microprocessors and is not shown in the Figure) and a driving circuit (also not shown) which are for computing control values of control targets such as the engine, transmission and the like, and for controlling and driving the corresponding actuators of the control targets. The communication IC 8 receives transmission data generated by the control circuit, converts the transmission data into serial data as a transmission signal TX for transmission, provides the transmission signal TX to the transmission line 4 via the driver circuit 10, receives a reception signal RX from the transmission line 4 via a receiver circuit 20, converts the reception signal RX into reception data and provides the reception data to the control circuit.

The communication IC 8 operates by receiving a fixed voltage VD (for example, +5V) from a power source circuit which is for producing a constant voltage and which is disposed inside the ECU 2. Meanwhile, the functions of the communication IC 8 can be built into the control circuit of the ECU 2 and implemented by a process of the microprocessor which forms the control circuit.

The driver circuit 10 is for providing a signal to the transmission line 4 after receiving the transmission signal TX from the communication IC 8. As shown in FIG. 1, the driver circuit 10 basically includes an integrator 10a for integrating the transmission signal TX and a power source 10b for producing current iL in accordance with an integrated value of the transmission signal TX obtained by the integrator 10a and for providing the same current iL to the transmission line 4. Meanwhile, the driver circuit 10 operates by receiving a power source voltage VC (for example, 12 volts of battery voltage) that is supplied to the power source circuit inside the ECU 2 from an outside source. The power source voltage VC is supplied even when the ignition switch of the automobile is deactuated.

Similar to the driver circuit 10, the receiver circuit 20 operates by receiving the power source voltage VC supplied from the outside. The receiver circuit 20 is for restoring the transmission signal TX from another ECU 2 as the reception signal RX based on the voltage level VL of the transmission line 4. The receiver circuit 20 includes a pair of resistors 20b, 20c for producing a determination voltage VS by dividing the power source voltage VC and a comparator 20a for producing the reception signal RX by comparing the determination voltage VS produced at resistors 20b, 20c with the voltage level VL of the transmission line 4. The reception signal RX is set to a high level when VL≧VS and to a low level when VL<VS.

A total amount of constant current which a pair of the terminal circuits 6 connected to the transmission line 4 absorb from the transmission line 4 is set to a constant value iT which is smaller than a maximum amount iD of current the driver circuit 10 provides to the transmission line 4.

In the data communication device of the present invention, when the ECU 2 performs the data transmission, the driver circuit 10 inside the ECU 2 gradually increases/decreases the output current iL provided to the transmission line 4 in accordance with the transmission signal TX provided by the communication IC 8. Since the pair of terminal circuits 6 connected to the transmission line 4 absorbs the current provided to the transmission line 4 by the driver circuit 10, the voltage level of the transmission line 4 immediately changes to the high level or the low level at a predetermined timing after switching the level of the transmission signal TX.

Figure 3A:
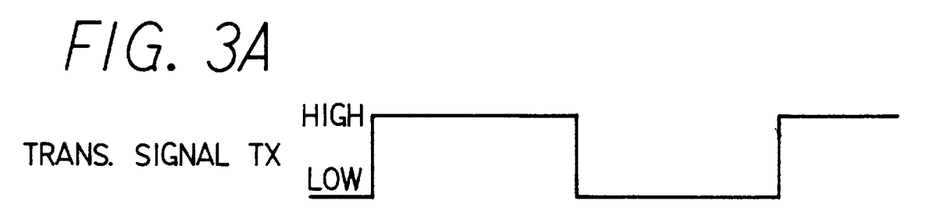
FIGS. 3A–3D are graphs illustrating an operation of the data communication device according to the first embodiment.
Figure 3B:
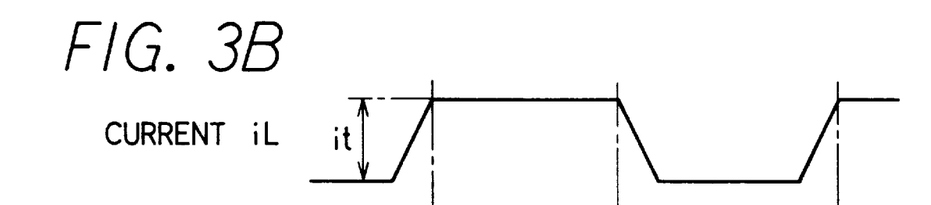
Figure 3C:
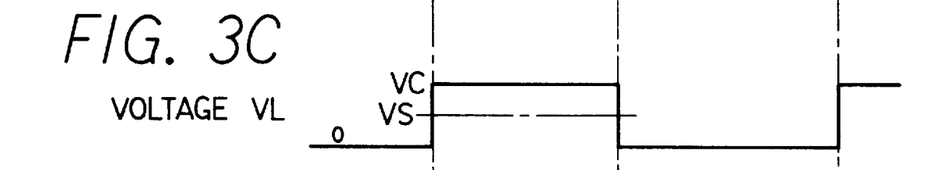

That is, as shown in FIGS. 3A–3D, when the transmission signal TX provided by the communication IC 8 to the transmission line 4 switches from low to high (FIG. 3A), the output voltage from the integrator 10a increases gradually at a constant rate from 0 volts. A current corresponding to the output voltage is produced at the current source 10b and provided to the transmission line 4 (FIG. 3B). Therefore, an output current iL which flows to the transmission line 4 gradually increases following the rising edge of the transmission signal TX (FIG. 3B). The voltage level of the transmission line 4 is kept at the low level (0 V) until the output current iL from the driver circuit 10 reaches the constant current iT which is the total amount of current absorbed by the pair of terminal circuits 6 (FIG. 3C).

Even though the output current iL from the driver circuit 10 has reached the level of the constant current iT absorbed by the pair of terminal circuits 6 (FIG. 3B), the driver circuit 10 has the capacity to increase the output current iL to a maximum value iD and so, the driver circuit 10 increases the output current iL. When the output current iL from the driver circuit 10 exceeds the constant current iT, since the pair of terminal circuits 6 cannot absorb all of the current generated by the driver circuit 10, the voltage level of the transmission line 4 increases immediately (FIG. 3C). When the voltage level of the transmission line 4 increases and becomes close to the supply voltage VC of the driver circuit 10, the driver circuit 10 cannot increase the output current iL any more and the voltage level of the transmission line 4 equals the supply voltage VC. Thus, the output current iL of the driver circuit 10 stabilizes at the level of the constant current iT absorbed by the pair of terminal circuits 6 (time t1) (FIG. 3B).

Next, when the transmission signal TX provided to the driver circuit 10 switches from high to low (FIG. 3A), the output voltage from the integrator 10a decreases gradually at a constant rate from a predetermined value H which corresponds to the high level of the transmission signal TX and so, the power source 10b also tries to reduce the output current iL to the transmission line 4 (FIG. 3B). Therefore, the output voltage from the integrator 10a decreases (FIG. 3C). Accordingly, when the output current iL from the power source 10b decreases and becomes smaller than the amount of current iT absorbed by the pair of terminal circuits 6 (FIG. 3C), the voltage level of the transmission line 4 immediately drops to the low level (0 V) because all of the output current iL will be absorbed by the pair of terminal circuits 6 (FIG. 3C). The voltage level of the transmission line 4 is subsequently maintained at the low level (time t2) (FIG. 3C).

Figure 3D:
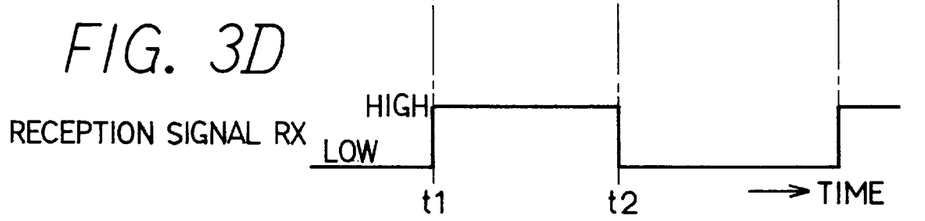

Therefore, in the data communication device of the present embodiment, by gradually changing the level of the output current iL to the transmission line 4 from the driver circuit 10 via the operations of the driver circuit 10 provided in the ECU 2 and the pair of the terminal circuits 6 connected to the transmission line 4, the voltage level VL of the transmission line 4 can be switched immediately in accordance with the transmission signal TX while preventing the generation of noise. Further, the transmission signal TX transmitted to the transmission line 4 by another ECU 2 can be restored correctly in the receiver circuit 20 by comparing the voltage level VL and the determination voltage VS (FIG. 3D).

Resistors 20b, 20c for determining the determination voltage VS in the receiver circuit 20 are for dividing the power source voltage VC supplied to the driver circuit 10. When resistors of equal resistances are used as resistors 20b, 20c, the determination voltage VS can be easily set to a voltage halfway between the high level and the low level of the transmission line 4. Furthermore, since the voltage level of the transmission line 4 switches immediately from the high level to the low level or vice versa, the transmission signal TX flowing to the transmission line 4 can be restored correctly without strictly adjusting the resistance values of the resistors 20b, 20c which set the determination voltage VS of the receiver circuit 20.

Also, in the present embodiment, in order to suppress the noise from the transmission line 4, the transmission signal TX is integrated in the driver circuit 10 and the current iL whose magnitude corresponds to the integrated value is discharged into the transmission line 4. With the voltage wave of the transmission line 4 changing in a square wave regardless of the waveform of the output current, the receiver circuit 20 can restore the transmission signal TX without being affected by the changing characteristics of the output current iL from the driver circuit 10, and thus, the present embodiment can even be applied to a data communication device which employs an access method for dealing with collisions such as the CSMA/CD (carrier-sense multiple access with collision detection) method and the like.

In other words, after the transmission signal TX provided to the driver circuit 10 is inverted, the delay time until the voltage level of the transmission line 4 changes is determined based on the delay times of the integrator load and the power source 10b which form the driver circuit 10, the slope of the output current iL, and the current level iT of the constant current absorbed by the pair of terminal circuits 6. The delay time is affected to a certain degree by the amount of undesired or stray capacitance of the communication line 4. However, since the driver circuit 10 increases the output current iL in accordance with the increase in the undesired capacitance of the communication line 4, delay time related to the undesired capacitance during changes in the voltage level of the communication line 4 can be minimized. Therefore, the pulse width of the reception signal RX obtained at the receiver circuit 20 does not differ from the pulse width of the transmission signal TX, and the pulse width of the receiver signal RX does not change in accordance with the usage condition. Thus, data communication can be accurately performed even in a data communication device which employs an access method such as the CSMA/CD method and the like.

Since a pair of terminal circuits 6 are connected to both ends of the transmission line 4, data communication can be executed normally between the ECUs 2 connected through the transmission line 4 even when one of the terminal circuits 6 breaks down or the transmission line 4 snaps and so, the reliability of the data communication device improves. That is, even if any of the malfunctions described above occur, since the current iL can be absorbed from the transmission line 4 by one of the terminal circuits 6 during such a malfunction even though the current iL absorbed from the transmission line 4 will be less than the normal level and the time period for the voltage level VL of the transmission line 4 to invert after switching the transmission signal TX will be shortened, there will be no large changes in the pulse width of the reception signal RX generated in the receiver circuit 20 due to such change in the time delay. Thus, data communication can be continued. It must be noted here that the terminal circuit 6 may be provided inside the ECU 2.

Figure 4A:
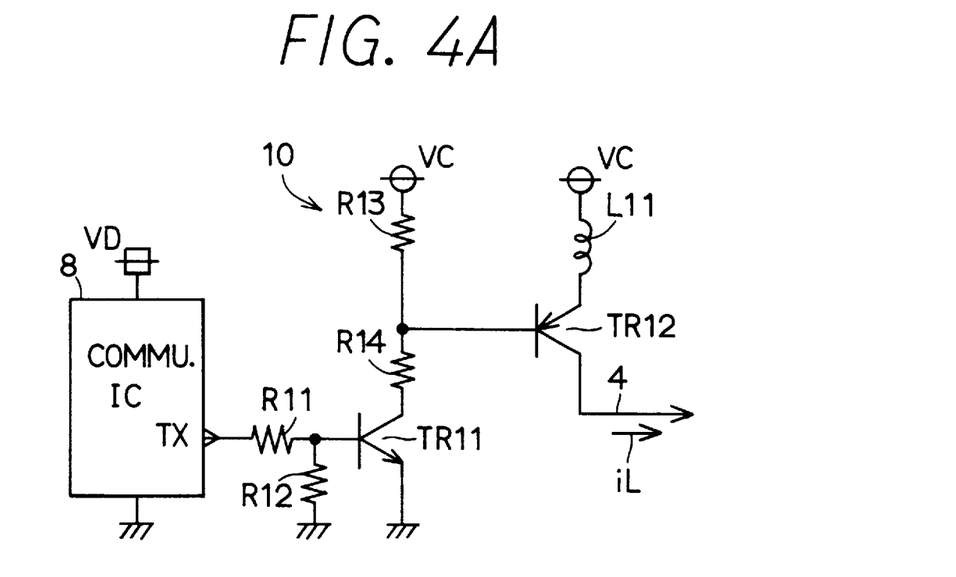
FIGS. 4A and 4B are schematic diagrams of the driver circuit.
Figure 4B:
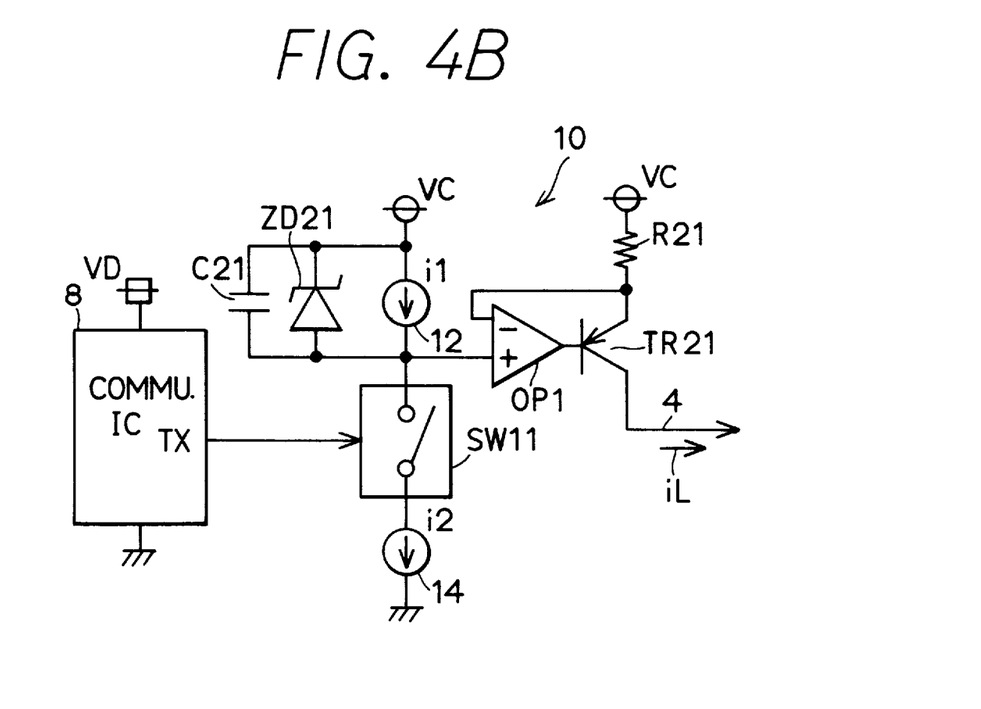

Although the driver circuit 10 which basically includes the integrator 10a and the power source 10b has been explained hitherto, variations on the construction of the driver circuit 10 are shown in FIGS. 4A and 4B. These variations on the driver circuit 10 are explained hereinafter.

FIG. 4A is a circuit diagram of the driver circuit 10 which is realized as a discrete circuit having a minimum number of required parts.

As shown in FIG. 4A, the driver circuit 10 includes an NPN transistor TR11 and a PNP transistor TR12. The base of the transistor TR11 is connected to an output port of the transmission signal TX of the communication IC 8 via a resistor R11 and is grounded via a resistor R12. The collector of the same transistor TR11 is connected to the power source line, which supplies the power source voltage VC, via resistors R13, R14 and the emitter of the same is grounded. The base of the transistor TR12 is connected to the connection point between resistors R13, R14. The emitter of the transistor TR12 is connected to the power source line via the inductor L11 while the collector of the same is connected to the transmission line 4.

In the above-described driver circuit 10, when the transmission signal TX switches from the low level to the high level, with the signal voltage divided by resistors R11, R12, current flows to the base of the transistor TR11 and so, the transistor TR11 is actuated. With the transistor TR11 actuated, current flows through resistors R13, R14, the voltage at the base of the transistor 12 becomes lower than the power source voltage and with resistor R14 absorbing the base current of the transistor TR12, the transistor TR12 is actuated.

When the transistor TR12 is actuated, current is immediately released to the transmission line 4. However, since the inductor L11 is provided in the emitter side of the transistor TR12, the inductor L11 prevents sudden changes in the level of current and the output current (collector current) iL to the transmission line 4 from the transistor TR12 is gradually increased.

As a result, the current integrated based on the transmission signal TX from the communication IC 8 is provided to the transmission line 4. That is, in the driver circuit 10, the inductor L11 and the transistor TR12 function as the integrator and the power source and the transistor TR11 and resistors R11–R14 function as driving control circuits for controlling the inductor L11 and the transistor TR12 in accordance with the transmission signal TX from the communication IC 8.

In the driver circuit 10, when the transmission signal TX from the communication IC 8 inverts to the low level, the transistor TR11 is deactuated and the voltage level of the base of the transistor TR12 approaches the power source voltage VC to immediately deactuate the transistor TR12. However, since the emitter of the transistor TR12 is connected to the inductor L11, the inductor L11 tries to raise the emitter voltage in response to the reduction in the emitter current. As a result, the transistor TR12 cannot be deactuated, and the collector current of the transistor TR12 as well as the output current iL to the transmission line 4 are reduced gradually because of energy accumulated in the inductor L11.

Therefore, as shown in FIG. 4A, the driver circuit 10 for gradually increasing or decreasing the output current iL to the transmission line 4 in accordance with the transmission signal TX can be constructed at a low cost with a simple construction that includes two bipolar transistors, a resistor and an inductor.

Meanwhile, while the driver circuit 10 shown in FIG. 4A uses the inductor L11 to gradually change the output current iL to the transmission line 4, it is difficult to mount the inductor L11 in an integrated circuit and so, the inductor L11 must be provided separately when the driver circuit 10 is to be packaged into an IC.

Thus, FIG. 4B illustrates a driver circuit 10 which can be realized without the inductor L11 and thus, this driver circuit 10 can be easily packaged into an IC.

That is, the driver circuit 10 shown in FIG. 4B includes a constant current source 12 which discharges a constant amount of current i1 and a constant current source 14 which discharges a constant amount of current i2 which is twice the current i1 from the constant current source 12. A switch circuit SW11 which includes FETs or the like is provided between the constant current sources 12, 14. The constant current sources 12, 14 are disposed between the power source line which supplies power source voltage VC and the ground line so that current flow will be from the constant current source 12 to the constant current source 14. The constant current source 12, which is in the power source line side, is connected in parallel with a capacitor C21 and a Zener diode ZD21.

Furthermore, in the driver circuit 10, the emitter of the PNP transistor TR21 is connected to the power source line via the resistor R21 while the collector of the same transistor TR21 is connected to the transmission line 4. A non-inverting input terminal (+) of an operational amplifier OP1 is connected to the connection point of the constant power source 12 and the switch circuit SW11 while the output terminal of the same operational amplifier OP1 is connected to the base of the transistor TR21. The inverting input terminal (−) of the operational amplifier OP1 is connected to the emitter of the transistor TR21.

The switch circuit SW11 operates by receiving the transmission signal TX from the communication IC 8 and is actuated when the transmission signal TX is at the high level and deactuated when the same signal TX is at the low level.

In the above-described driver circuit 10, when the transmission signal TX from the communication IC 8 switches from the low level to the high level, the switch circuit SW11 is actuated. At this point, the constant power sources 12, 14 are both actuated with each of these power sources 12, 14 trying to discharge constant currents i1, i2. However, since the constant current i2 from the constant power source 14 is larger than the constant current i1 from the constant power source 12, the capacitor C21 is charged at the constant current i1 (=i2−i1) which corresponds to the difference between currents i1, i2, and the input voltage to the non-inverting input terminal (+) of the operation amplifier OP1 gradually decreases from the level of the power source voltage VC.

Since the capacitor C21 is connected in parallel with the Zener diode ZD21, the charging of the capacitor C21 is performed until the voltage across the capacitor C21 becomes a predetermined voltage based on the breakdown voltage of the Zener diode ZD21. When the transmission signal TX is at the high level, the input voltage to the non-inverting input terminal (+) of the operation amplifier OP1 is ultimately reduced to a predetermined voltage which is obtained by subtracting the breakdown voltage of the Zener diode ZD21 from the power source voltage VC.

The operation amplifier OP1 generates the output signal so that the voltage of the non-inverting input terminal (+) is equal to that of the inverting input terminal (−) (as well as the voltage of the emitter of the transistor TR21). Therefore, when the input voltage to the non-inverting input terminal (+) of the operational amplifier OP1 becomes lower than the power source voltage VC, the operation amplifier OP1 controls the base current of the transistor TR21 to make the emitter voltage of the transistor TR21 equal to such input voltage.

As a result, the emitter current of the transistor TR21 gradually increases and will have an integrated waveform shape having a slope in accordance with the resistance of the resistor R21. Since the collector current of the transistor TR21 changes in the same way as the emitter current, the output current iL from the driver circuit 10 gradually increases following the rising edge of the transmission signal TX.

Next, when the transmission signal TX from the communication IC 8 switches from the high level to the low level, the switch circuit SW11 is deactuated and the constant current power source 14 stops absorbing the current from the side of the constant current power source 12. Therefore, charge accumulated at the capacitor C21 is discharged gradually by the constant current il from the constant current source 12. Thus, contrary to when the switch circuit SW11 is actuated, the input voltage to the non-inverting input terminal (+) is gradually increased to the level of the power source voltage VC and the output current iL from the transistor TR21 to the transmission line 4 gradually decreases.

The Zener diode ZD21 is for preventing the input voltage to the non-inverting input terminal (+) of the operation amplifier OP1 from becoming too small. The breakdown voltage of the Zener diode ZD21 is preferably set to the minimum amount necessary for fully actuating the transistor TR21. In other words, when the Zener diode ZD21 is not provided or, in case the Zener diode ZD21 has a high breakdown voltage, the transistor TR21 will completely deactuate and the time period until the amount of current discharged into the transmission line 4 becomes zero is prolonged. Therefore, it is preferable that a Zener diode ZD21 whose breakdown voltage has a minimum value sufficient for actuating the transistor TR21 is used.

In this way, with the driver circuit 10 shown in FIG. 4B, the capacitor C21 is recharged or discharged in accordance with the transmission signal TX generated from the communication IC 8 and the voltage, which is for controlling the output current iL and which is gradually increased or decreased in accordance with the transmission signal TX, is generated. The output current iL provided to the transmission line 4 via the transistor TR21 is controlled by providing such voltage to the non-inverting input terminal (+) of the operational amplifier OP1. Thus, unlike the driver circuit 10 shown in FIG. 4A, the driver circuit 10 shown in FIG. 4B does away with the inductor and thus, this driver circuit 10 can be easily packaged into an IC chip.

In the driver circuit 10 shown in FIG. 4B, the capacitor C21, the constant current sources 12, 14, the Zener diode ZD21 and the switch circuit SW11 operate as the integrator 10a shown in FIG. 1 while the operational amplifier OP1, the transistor TR21 and the resistor R21 operate as the current source 10b.

Next, in the foregoing embodiments, the terminal circuits 6 can be constant current circuits for absorbing the constant current from the transmission line 4 and so known kinds of constant current circuits can be used as the terminal circuit 6. FIGS. 5A–5D illustrate some examples of terminal circuits 6 which are briefly explained hereinafter.

Figure 5A:
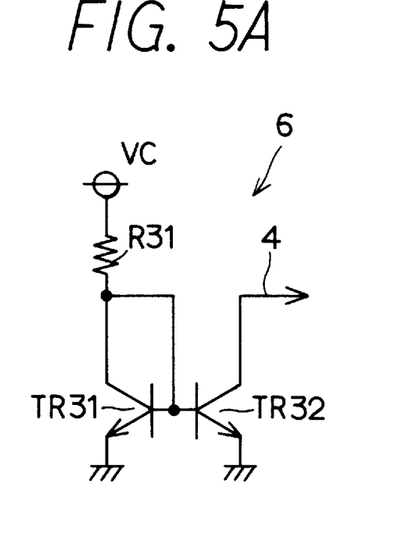
FIGS. 5A–5D are schematic diagrams of a terminal circuit.

The terminal circuit 6 shown in FIG. 5A is a constant current circuit which uses a current mirror circuit that includes a pair of NPN transistors TR31, TR32. The bases of these transistors TR31, TR32 are connected to each other while grounding both of their emitters. The collector of one transistor TR31 is connected to the power source line, which supplies the electric power source voltage VC, via a resistor R31 while the collector of the other transistor TR32 is connected to the transmission line 4. The base and collector of the transistor TR31 are connected to each other. As a result, a constant current determined based on the power source voltage VC and the resistance value of the resistor R31 flows to the transistor TR31 while the same amount of constant current is absorbed by the other transistor TR32 from the transmission line 4.

Figure 5B:
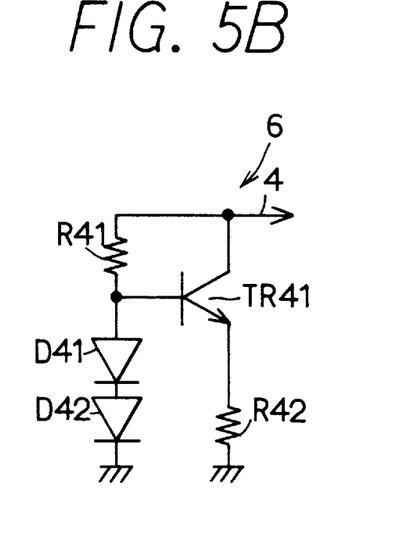

The terminal circuit 6 shown in FIG. 5B has the collector of a transistor TR41 connected to the transmission line 4 with the emitter of the same transistor TR41 grounded via a resistor R42. The base of the transistor TR41 is connected to anode of the diode D41 and to the collector of the same transistor TR41 via the resistor R41. Furthermore, the cathode of the diode D41 is connected to the anode of the diode D42 whose cathode is connected to the ground. The diodes D41, D42 may be considered as one diode assembly.

In the above-described terminal circuit 6, when the voltage of the transmission line 4 increases, current flows to the diodes D41, D42 via the resistor R41 and the base voltage of the transistor TR41 is fixed to a forward direction voltage drop value (about 1.2 V) of the diodes D41, D42. At this state, the transistor TR41 is actuated and absorbs the current from the transmission line 4. However, since the emitter voltage (that is, the voltage across both ends of the resistor R42) of the transistor TR41 stabilizes when it becomes equal to the forward direction voltage drop value of one diode, the current absorbed by the transistor TR41 will have a constant value based on the forward direction voltage drop of one diode and the resistance of the resistor R42. Therefore, this terminal circuit 6 operates as the constant current for absorbing the constant current from the transmission line 4.

An end of the resistor R41 opposite to the end connected to the base of the transistor TR41 is connected to the collector (that is, the transmission line 4) of the transistor TR41 so that a constant voltage which is determined based on diodes D41, D42 can be applied to the base of the transistor TR41. Therefore, one end of the resistor R41 does not have to be necessarily connected to the transmission line 4. For example, one end of the resistor R41 can be connected to another power source as shown in FIG. 5C.

Figure 5C:
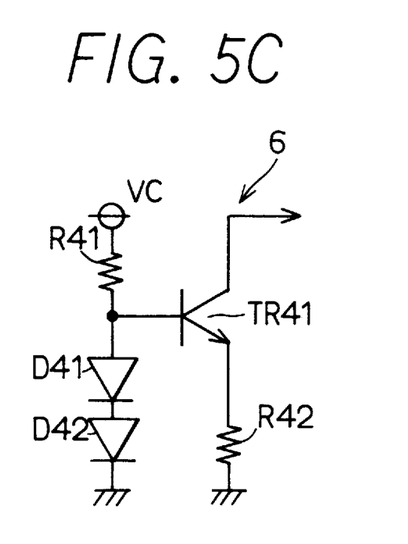
Figure 5D:
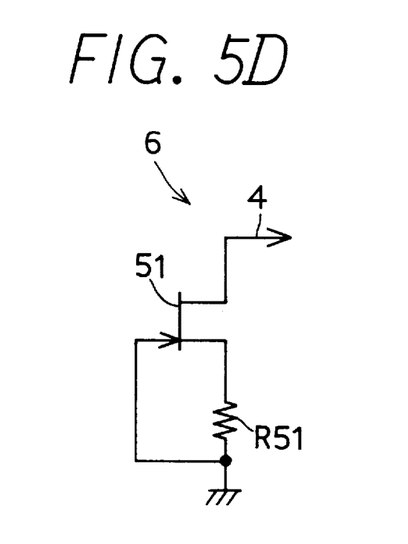

The terminal circuit 6 shown in FIG. 5D includes an N-channel junction FET (field effect transistor) 51. The N-channel junction FET 51 is arranged such that its drain is connected to the transmission line 4, its source is grounded via the resistor R51 and its gate is grounded. In the terminal circuit 6 constructed in this way, the junction FET 51 controls a bias voltage of the gate based on a self-released source current and the resistance value of the resistor R51 and absorbs the constant current from the transmission line 4. With this type of circuit, the terminal circuit 6 can have a simple configuration.

Next, when constructing the communication device inside the ECU 2, a practical communication device which considers the protection of its internal circuits is explained hereinafter.

Figure 6:
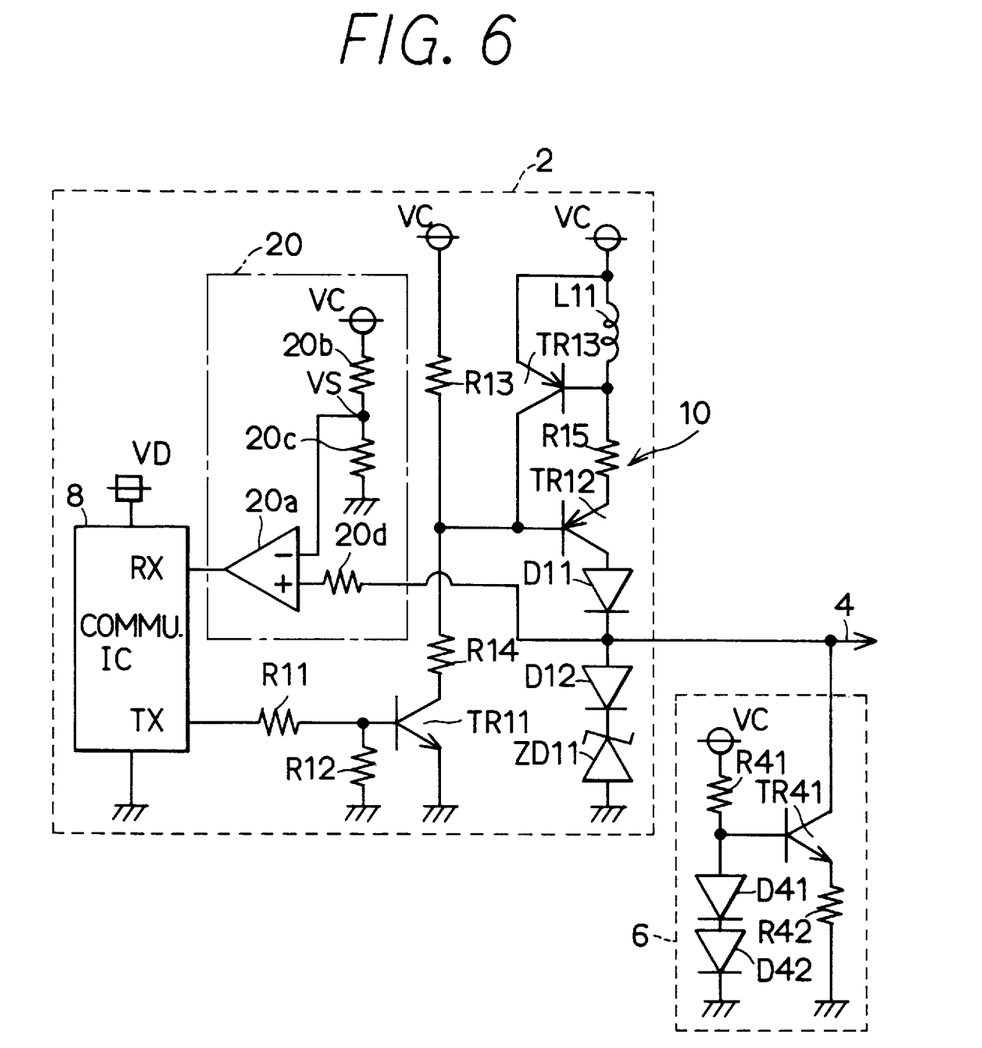
FIG. 6 is a schematic diagram illustrating an implementation of the driver and the receiver circuits.

FIG. 6 illustrates a communication device inside the ECU 2 where the terminal circuit 6 uses the constant current circuit shown in FIG. 5C.

In the communication device shown in FIG. 6, as the receiver circuit 20 shown in FIG. 1, the receiver circuit 20 here includes the comparator 20a and resistors 20b, 20c for setting the determination voltage VS. Furthermore, a resistor 20d for protecting the input of the comparator 20a is provided on a signal line connecting the comparator 20a and the transmission line 4.

The circuit shown in FIG. 4A is basically used as the driver circuit 10. However, in order to protect the transistor TR12 used for generating the current from grounding of the transmission line 4, a resistor R15 disposed between the emitter of the transistor TR12 and the inductor L11 and a PNP transistor TR13 are additionally provided to the driver circuit 10. The transistor TR13 has its collector connected to the base of the transistor TR12, its base connected to the point connecting the resistor R15 and the inductor L11 and its emitter connected to the electric power source line. Accordingly, when a large amount of current starts to flow out from the driver circuit 10 due to the grounding of the transmission line 4, the voltage drops across the resistor R15, the transistor TR13 is actuated and the base current of the transistor TR12 is reduced to prevent the excessive amount of current from flowing from the transistor TR12 to the transmission line 4. In other words, the resistor R15 and the transistor TR13 form an excessive current protection circuit.

In addition, a Zener diode ZD11 is provided to prevent the application of excessive voltage to the driver circuit 10 from the transmission line 4. Furthermore, diodes D11, D12 are provided so that the signal on the transmission line 4 will not be affected when power supplied to the ECU 2 stops. In other words, the diode D11 is provided between the collector of the transistor TR12 for generating the current and the transmission line 4 with the cathode of the diode D11 connected to the transmission line 4. The anode of the diode D12 is connected to the transmission line 4 while the cathode of the same diode D12 is connected to ground via the Zener diode ZD11. As a result, even though an excessive voltage is produced in the transmission line 4, such voltage is kept below a predetermined voltage which is determined based on the breakdown voltage of the Zener diode ZD11 and the forward voltage drop of the diode D12. When the power supplied to the ECU 2 stops, diodes D11, D12 can prevent the current from flowing into the ECU 2 from the transmission line 4.

The data communication device of the present embodiment has been described in the above as a device in which a plurality of ECUs 2 are connected via one transmission line 4, the current flows to the transmission line 4 from the driver circuit 10 disposed inside each ECU 2 and the current flowing in the transmission line 4 is absorbed by the terminal circuits 6 connected to the transmission line 4. Therefore, the generation of radio-frequency noise is prevented by gradually changing the amount of current flowing in the transmission line 4 while immediately switching the voltage of the transmission line 4 between the high and low levels in accordance with the transmission signal TX so that accurate data communication can be performed. While the data communication device has been constructed in the above manner, for example, it may also be constructed so that the driver circuit 10 is configured to absorb the current from the transmission line 4 with the terminal circuit 6 discharging constant current to the transmission line 4. In this case, the same effects and benefits as that of the present embodiment can also be obtained.

Figure 7:
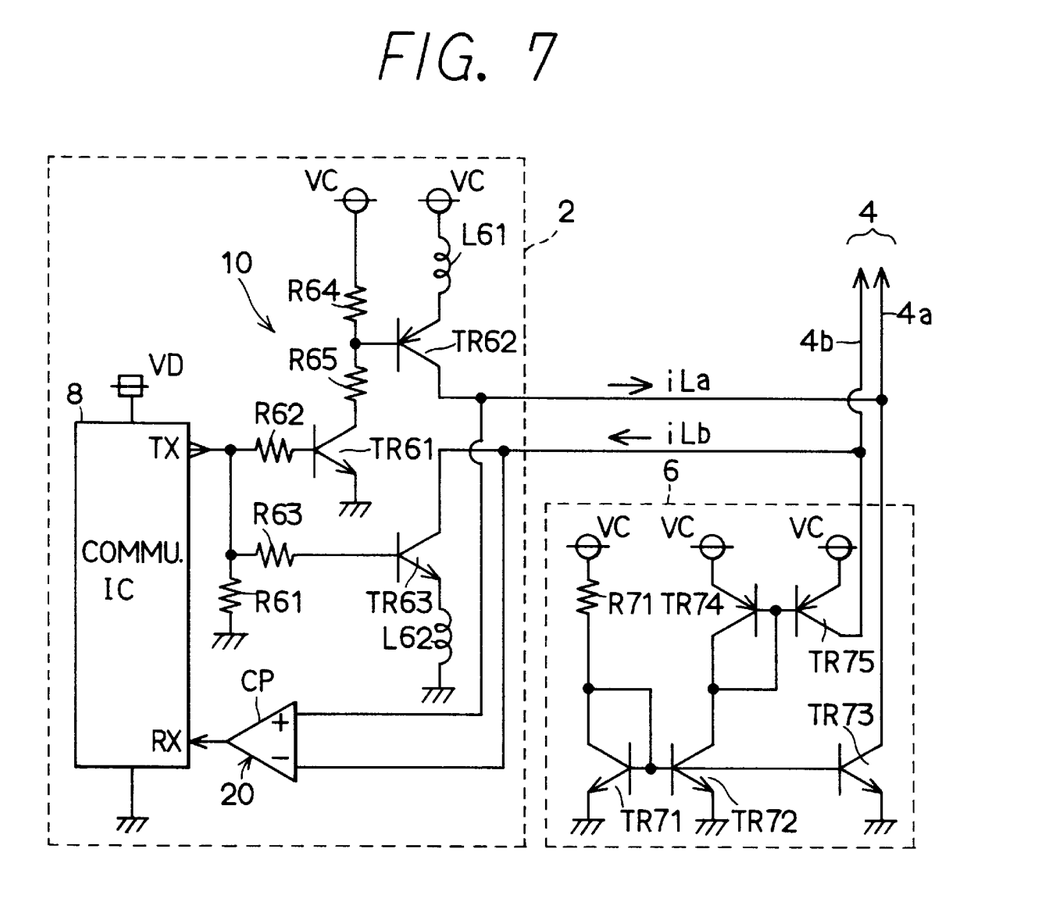
FIG. 7 is a schematic diagram illustrating the data communication device using a twisted-pair cable as a transmission line.

Also, for example, as shown in FIG. 7, the transmission line 4 may include a twisted-pair cable formed from a pair of signal lines 4a, 4b, the driver circuit 10 may include a pair of power sources for sourcing or sinking the current with respect to each of signal lines 4a, 4b of the transmission line 4, and the terminal circuit 6 may include a pair of constant power sources for executing the inflow or outflow of the current with respect to each of signal lines 4a, 4b of the transmission line 4.

That is, in the data communication device shown in FIG. 7, the terminal circuit 6 includes three NPN transistors TR71, TR72, TR73 that form a current mirror circuit in which their bases are connected to each other and their emitters are connected to ground, and two PNP transistors TR74, TR75 which form a current mirror circuit in which their bases are connected to one other and their emitters are connected to the power source line.

In the same way as the transistor TR31 shown in FIG. 5A, the transistor TR71 shown in FIG. 5A has its collector connected to the power source line via the resistor R71 with its collector and base being connected with each other. Also, in the same way as the transistor TR32 shown in FIG. 5A, the transistor TR73 has its collector connected to the signal line 4a which is part of the transmission line 4. As a result, the constant current determined by the power source voltage VC and the resistance value of the resistor R71 flows in the transistor TR71 and the transistor TR73 absorbs the same constant current from the signal line 4a.

Also, the collector of the transistor TR72 is connected to the collector of the transistor TR74, the collector and base of the transistor TR74 are connected to each other and the collector of the transistor TR75, which forms the current mirror circuit with the transistor TR74, is connected to the signal line 4b which forms part of the transmission line 4. Because the transistor TR72 forms the current mirror circuit together with transistors TR71, TR73, the same constant current absorbed from the signal line 4a and flowing through the transistors TR71 and TR73 flows in the transistor TR72 via the transistor TR74. As a result, the same constant current flows in the transistor TR74 as well as in transistor TR75. Thus, the same constant current is released into the signal line 4b from the collector of the transistor TR75.

In other words, in the terminal circuit 6 shown in FIG. 7, the transistors TR73, TR75 function as current sources for discharging the constant current with the constant current being absorbed from the signal line 4a of the transmission line 4 and the same constant current being supplied to the signal line 4b.

Meanwhile, in the communication device inside the ECU 2, the receiver circuit 20 includes the comparator CP for comparing the potentials of the signal lines 4a, 4b. The comparator CP generates the reception signal RX which is set to the high level when the potential of the signal line 4a is higher than the potential of the signal line 4b and to the low level when the potential of the signal line 4a is lower than the potential of the signal line 4b. The comparator CP provides the reception signal RX to the communication IC 8.

In the communication device inside the ECU 2, the driver circuit 10 includes an outflow driver circuit for releasing current to the signal line 4a of the transmission line 4 and an inflow driver circuit for absorbing the current from the signal line 4b of the transmission line 4.

Similar to the driver circuit 10 shown in FIG. 4A, the outflow driver circuit includes an NPN transistor TR61, a PNP transistor TR62, resistors R62, R64, R65, and an inductor L61. Resistor R62 is for actuating the transistor TR61 when the transmission signal TX generated by the communication IC 8 and provided to a base thereof is at the high level. The pair of resistors R64, R65 are disposed in series between the collector of the transistor TR61 and the power line. These pair of resistors R64, R65 restrict the flow of current when the transistor TR61 is actuated and have a connection point connected to the base of the transistor TR62 for reducing the base voltage of the transistor TR62 to be lower than the power voltage when the transistor TR61 is actuated. The inductor L61 is disposed between the emitter of the transistor TR62 and the power line. By connecting the collector of the transistor TR62 to the signal line 4a of the transmission line 4, the current iLa which is gradually increased or decreased in accordance with the transmission signal TX is discharged to the signal line 4a.

The inflow driver circuit is the opposite of the outflow driver circuit. The inflow driver circuit includes an NPN transistor TR63, a resistor R63 for actuating the transistor TR63 when the transmission signal TX generated from the communication IC 8 to the base of the same transistor TR63 is at the high level, a ground resistor R61 connected to the end of the resistor R63 and which is near the communication IC 8, and an inductor L62 disposed between the emitter of the transistor TR63 and the ground line. By connecting the collector of the transistor TR63 to the signal line 4b of the transmission line 4, a current iLb which is gradually increased or decreased in accordance with the transmission signal TX from the signal line 4b is received.

The ground resistor R61 is for providing current to the base of the transistor TR63 and for gradually reducing the current in the transistor TR63 when the transmission signal TX switches from the high level to the low level when the transistor TR63 is going to be deactuated, and the emitter voltage of the transistor TR63 becomes lower than the potential of the ground line due to the energy accumulated in the inductor L62.

According to the data communication device shown in FIG. 7, since noise generated in each of signal lines 4a, 4b that form the transmission line 4 are made to cancel each other, the generation of noise can be curbed and the accuracy of the data communication can be improved.

Figure 8:
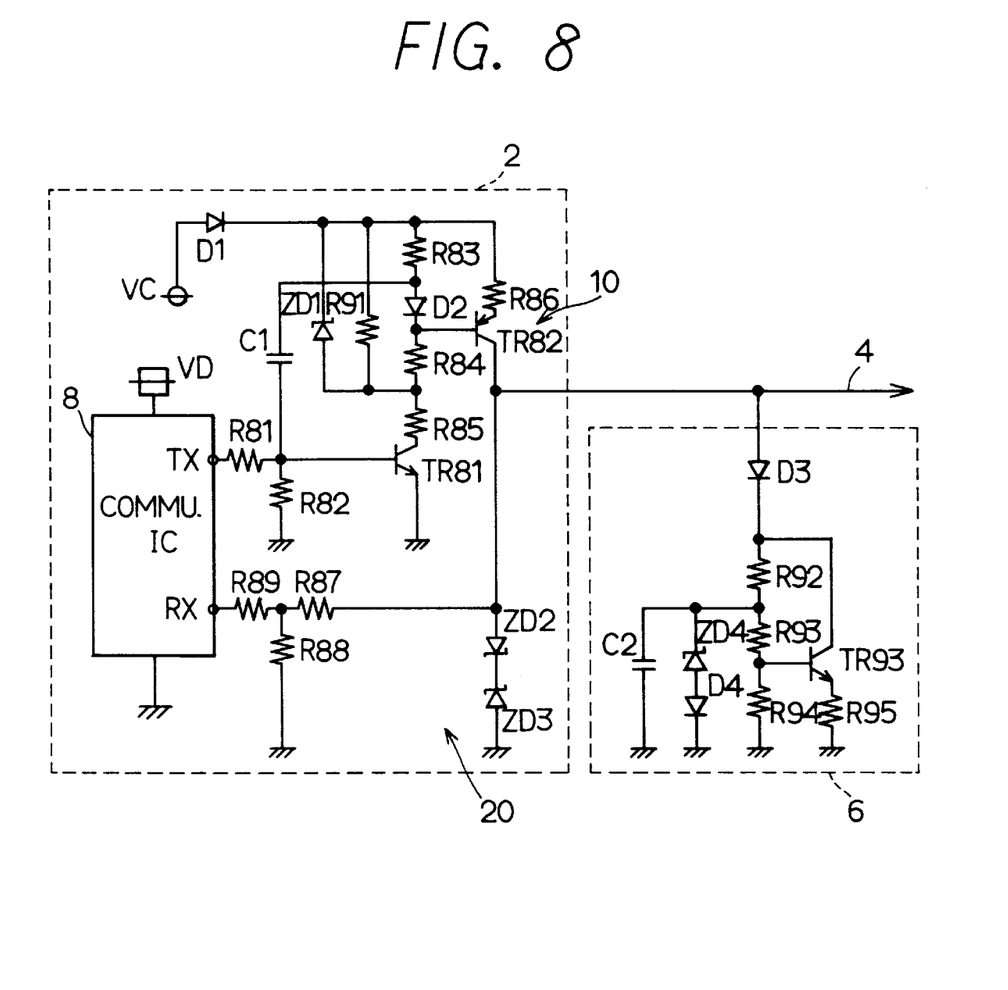
FIG. 8 is a schematic diagram illustrating the driver and the receiver circuits according to a further embodiment of the present invention.

Meanwhile, FIG. 8 shows another construction of the data communication device according to another embodiment of the present invention.

First, the operation of the ECU 2 is explained hereinafter.

When the transmission signal TX from the communication IC 8 inverts from the low level to the high level, voltage divided by resistors R81, R82 is provided to the base of a transistor TR81 to actuate the same. When the transistor TR81 is actuated, the voltages across resistors R84, R85 and a diode D2 decrease. At this point, a negative feedback is applied to the base of a transistor TR82 via a capacitor C1. Accordingly, the voltage of the base of the transistor TR82 changes gradually. While the transistor TR81 remains actuated, the voltage of the base of the transistor TR82 continues to decrease until it is clamped by the voltage of a Zener diode ZD1. Conversely, the voltage of the base of the transistor TR82 increases gradually when the transmission signal TX from the communication IC 8 switches from the high level to the low level.

In this way, the base voltage of the transistor TR82 changes in such a way that its waveform has a trapezoidal shape which indicates the integrated value of the transmission signal TX from the communication IC 8. The collector current of the transistor TR82 will change in such a way that its waveform will have a trapezoidal shape similar to that of the base voltage because the resistor R86 and the transistor TR82 function so that changes in the base voltage of the same transistor TR82 are reflected in the collector current (output current). Thus, the driver circuit 10 of the communication device of the present embodiment can gradually increase or decrease the output current in accordance with the transmission signal TX from the communication IC 8.

Meanwhile, an auxiliary resistor R91 is provided in the driver circuit 10 to ensure that the transistor TR82 is deactuated when the TR81 is not being actuated. On the other hand, a diode D1 is provided for preventing the reverse connection of the electric power source line. Furthermore, resistors R87, R88, R89 are for dividing the voltage of the transmission line 4 that will be provided to the communication IC 8.

The operation of the terminal circuit 6 according to the present embodiment is explained hereinafter.

An auxiliary diode D3 is provided for preventing the reverse flow of current from the terminal circuit 6.

When the voltage of the transmission line 4 is at the low level, a transistor TR93 remains deactuated since no power is supplied to the terminal circuit 6 and current only flows from the transmission line 4 to the ground via resistors R92, R93, R94. When the collector current of the transistor TR93 gradually increases, a capacitor C2 is gradually charged up to a clamp voltage determined by a Zener diode ZD4 and a diode D4. When the voltage stored in the capacitor C2 rises above the clamp voltage, the base voltage of the transistor TR93 divided by resistors R93, R94 rises only up to a predetermined voltage level regardless of the voltage level of the transmission line 4. Because the base voltage of the transistor TR93 is clamped, this terminal circuit 6 acts as a low level current source.

The operation of the entire communication device according to the present embodiment is explained hereinafter. When the transmission signal TX from the communication IC 8 switches from the low level to the high level, the output of the ECU 2 which acts as the transceiver increases and when such output current exceeds the amount of current being taken in by the terminal circuit 6, the voltage of the transmission line 4 switches to the high level immediately. When the voltage of the transmission line 4 increases and approaches the voltage level of the electric power source, the transceiver 2 will no longer be able to increase its output current and so the level of its output current stabilizes. On the other hand, when the transmission signal TX from the communication IC 8 switches from the high level to the low level, the transceiver 2 will gradually reduce its output current. When the output current decreases below the level of current the terminal circuit 6 absorbs, the voltage of the transmission line 4 decreases rapidly to the low level. However, the decrease in the output current of the transceiver 2 is gradual. Thus, in the transceiver 2 of above-described embodiment, steep changes in the voltage can be realized with only gradual changes in the current.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A data communication device for receiving a transmission signal from an external controller, said data communication device comprising:
   a transmission line;
   a plurality of communication units which are connected to each other via said transmission line, said communication units performing serial data communication with each other via said transmission line based on said transmission signal, each of said communication units including driving means for varying current flow in said transmission line in accordance with said transmission signal; and
   a constant current unit for conducting a constant amount of current on said transmission line in cooperation with said driving means, said constant amount of current being less than a maximum level up to which said driving means varies said current flow in said transmission line.

2. A data communication device according to claim 1, wherein:
   said plurality of communication units are connected to a power source for providing current to said transmission line; and
   said constant current unit absorbs said constant amount of current from said transmission line when said plurality of communication units provide current to said transmission line.

3. A data communication device according to claim 1, wherein:
   said plurality of communication units absorbs current from said transmission line; and
   said constant current unit is connected to a power source for providing said constant amount of current to said transmission line when said plurality of communication units absorb current from said transmission line.

4. A data communication device according to claim 1, wherein:
   at least one of the said driving means includes integrating means for obtaining an integrated value by integrating said transmission signal and a current source circuit for providing current to said transmission line based on said integrated value.

5. A data communication device according to claim 4, wherein:
   said integrating means includes a first constant current source, a second constant current source connected to ground in series with said first constant current source, a switch circuit provided between said first constant current source and said second constant current source, a capacitor connected in parallel with said first constant current source, and a Zener diode connected in parallel with said first constant current source; and
   said current source circuit includes a transistor whose emitter is connected to a power source and whose collector is connected to said transmission line, and an operational amplifier whose non-inverting input terminal is connected to said first constant current source, whose inverting terminal is connected to said emitter of said transistor and whose output terminal is connected to a base of said transistor.

6. A data communication device according to claim 1, wherein:
   at least one of the said driving means includes a first transistor whose emitter is connected to a power source and whose collector is connected to said transmission line for providing current to said transmission line, an inductor having terminals respectively connected to said power source and said emitter of said first transistor, and a second transistor whose base receives said transmission signal, whose collector is connected to a base of said first transistor and whose emitter is grounded.

7. A data communication device according to claim 6, wherein:
   at least one of the said driving means further includes a protective resistor electrically disposed between said emitter of said first transistor and said inductor, and a third transistor whose collector is connected to said base of said first transistor, whose base is connected to said protective resistor and whose emitter is connected to said power source, said protective resistor and said third transistor being for preventing excessive flow of current from said first transistor to said transmission line.

8. A data communication device according to claim 1, wherein:
   a plurality of said constant current units are connected to said transmission line, said constant current units conducting a total amount of current which is less than said maximum level of current to which said driving means varies said current flow in said transmission line.

9. A data communication device according to claim 8, wherein:
   at least one of said constant current units includes a pair of transistors whose emitters are grounded and whose bases are connected to each other, a collector of one of said transistors being connected to a power source and a collector of the other transistor being connected to said transmission line.

10. A data communication device according to claim 8, wherein:
    at least one of said constant current units includes a transistor whose emitter is grounded and whose collector is connected to said transmission line, a diode assembly whose anode is connected to a base of said transistor and whose cathode is grounded, and a resistor having terminals respectively connected to said collector and said base of said transistor.

11. A data communication device according to claim 8, wherein:
    at least one of said constant current units includes a transistor whose emitter is grounded and whose collector is connected to said transmission line, a diode assembly whose anode is connected to a base of said transistor and whose cathode is grounded, and a resistor connected to said base of said transistor and a power source.

12. A data communication device according to claim 8, wherein:
    at least one of said constant current units includes a resistor and a junction FET whose drain is connected to said transmission line, whose source is grounded via said resistor and whose gate is grounded.

13. A data communication device according to claim 1, wherein:
    at least one of said plurality of communication units include a Zener diode provided between said transmission line and ground.

14. A data communication device according to claim 1, wherein:
   said transmission line includes a pair of twisted signal lines;
   at least one of said driving means includes a pair of constant power sources for providing current to one of said twisted signal lines and absorbing current from the other line of said twisted signal lines; and
   said constant current unit includes a pair of constant power sources for providing current to one of said twisted signal lines and absorbing current from the other line of said twisted signal lines.

15. A data communication device according to claim 1, wherein:
   at least one of said driving means is for increasing and decreasing current in accordance with said transmission signal and for providing current to said transmission line; and
   said constant current unit is for absorbing said constant amount of current from said transmission line.

16. A data communication device according to claim 1, wherein:
   said communication units are for performing said serial data communication using a Carrier Sense Multiple Access/Collision Detect (CSMA/CD) method.

17. A data communication device according to claim 1, wherein:
   said transmission line is a single line which is connected to a vehicle chassis that serves as ground.

18. A data communication device according to claim 1, wherein:
   said communication units include a communication circuit, said communication circuit providing said transmission signal to said driving means.

19. A data communication device according to claim 1, wherein:
   said constant current unit is built-in inside said communication units.

20. A data communication device for receiving a transmission signal from an external controller, said data communication device comprising:
   a transmission line;
   a plurality of communication units which are connected to each other via said transmission line, said communication units being connected to a power source for providing current to said transmission line to perform serial data communication with each other via said transmission line based on said transmission signal, each of said communication units including driving means for varying current provided to said transmission line in accordance with said transmission signal; and
   a constant current unit connected to said transmission line for absorbing a constant amount of current from said transmission line when said driving means provides current to said transmission line, said constant amount of current being less than a maximum level up to which said driving means varies said current.

21. A data communication device for receiving a transmission signal from an external controller, said data communication device comprising:
   a transmission line;
   a plurality of communication units which are connected to each other via said transmission line, said communication units being for performing serial data communication with each other via said transmission line based on said transmission signal by absorbing current from said transmission line, each of said communication units including driving means for varying current flow in said transmission line in accordance with said transmission signal; and
   a constant current unit connected to said transmission line, said constant current unit being connected to a power source for supplying a constant amount of current to said transmission line when said driving means absorbs current from said transmission line, said constant amount of current being less than a maximum level up to which said driving means varies said current flow in said transmission line.

* * * * *

UNITED STATES PATENT AND TRADEMARK OFFICE
CERTIFICATE OF CORRECTION

PATENT NO. : 5,878,082
DATED : March 2, 1999
INVENTOR(S) : KISHIGAMI

It is certified that error appears in the above-identified patent and that said Letters Patent is hereby corrected as shown below:

ON THE COVER PAGE: ITEM

[73] Assignee: Nippondenson Co., Ltd., Kariya, Japan the face of the patent should read:

[73] Assignee: Nippondenso Co., Ltd., Kariya, Japan

Signed and Sealed this

Seventeenth Day of August, 1999

Attest:

Q. TODD DICKINSON

*Attesting Officer*  *Acting Commissioner of Patents and Trademarks*